United States Patent [19]

Moake

[11] Patent Number: 5,591,967
[45] Date of Patent: Jan. 7, 1997

[54] METHOD AND APPARATUS FOR DETERMINING NEUTRON DETECTOR OPERABILITY USING GAMMA RAY SOURCES

[75] Inventor: Gordon L. Moake, Houston, Tex.

[73] Assignee: Halliburton Company, Houston, Tex.

[21] Appl. No.: 320,859

[22] Filed: Oct. 11, 1994

[51] Int. Cl.⁶ .................................. G01V 5/10; G01T 3/00
[52] U.S. Cl. ........................ 250/252.1; 250/264; 250/266; 250/269.4; 250/390.01
[58] Field of Search .............................. 250/390.01, 264, 250/265, 266, 269.4, 252.1 R, 261

[56] References Cited

U.S. PATENT DOCUMENTS

| | | | |
|---|---|---|---|
| 3,511,994 | 5/1970 | Jonsson et al. | 250/390.01 |
| 3,710,166 | 1/1973 | Perelman et al. | 250/374 |
| 5,180,917 | 1/1993 | Wraight | 250/374 |
| 5,422,480 | 6/1995 | Schultz | 250/252.1 R |

OTHER PUBLICATIONS

Wiley et al, "Recommendations for Neutron Logging from the SPWLA Subcommittee for Log Calibration Guidelines", The Log Analyst, May–Jun. 1988, pp. 204–215.

Calibration, Checking and Physical Corrections For A New Dual-Spaced Neutron Porosity Tool, by M. P. Smith—27th Annual SPWLA Symposium in Houston, Texas, Jun. 1986.
Fundamentals of Helium-3 Filled Proportional Counters for Neutron Detection—Reuter-Stokes (no date), Twinsburg, Ohio, trade brochure.

*Primary Examiner*—Carolyn E. Fields

[57] ABSTRACT

The invention relates to an apparatus and method for verifying the operability of neutron detectors and associated pulse generating circuits in a neutron logging tool prior to committing the tool to the well borehole. The method comprises the steps of exposing the neutron detectors to a source or sources of gamma rays, determining the rate of detected gamma rays by counting detector output pulses, and comparing the detected rate to an expected value thereby to verify the operations of the detectors. In the apparatus in accordance with the invention, the gamma ray source(s) may be contained inside the tool near or mounted on the detectors themselves. In an alternate embodiment, the gamma ray source(s) may be externally applied to the tool at the surface during verification procedures. Counting of detected gamma rays is based on detection of detector pulser amplitudes falling in a range defined by first and second thresholds where gamma rays are those pulses falling in the range, while pulses outside the range, i.e., greater than the second threshold, represent detected neutrons.

27 Claims, 7 Drawing Sheets

METHOD AND APPARATUS FOR DETERMINING NEUTRON DETECTOR OPERABILITY USING GAMMA RAY SOURCES

BACKGROUND OF THE INVENTION

The present invention relates to the art of neutron well logging, and more particularly, to a method and apparatus for verifying the operability of neutron detectors in a neutron logging tool prior to insertion of the tool into a well borehole.

The invention may be advantageously used with neutron tools that employ an armored wireline cable to connect the tool with a surface data processing system during well logging operations. The invention may also be used with tools that perform logging measurements while drilling the well. Such systems are commonly referred to by the acronym "LWD" (Logging While Drilling), where measurement devices, disposed near the bottom of a drilling system, perform measurements while the borehole is being drilled.

Nuclear logging techniques using neutron detectors for making measurements on the subsurface formations surrounding a borehole are well known in the art. See, for example, the article Smith, *Calibration, Checking and Physical Corrections For A New Dual-Spaced Neutron Porosity Tool*, presented at the 27th Annual SPWLA Symposium, Houston, Tex., June 1986. Neutron logging tools generally include a source of neutrons and at least two neutron detectors, which could be of the so-called proportional counting type containing ionizable gas such as, e.g., helium-3 ($He^3$). Helium filled detectors used in such tools are available from several sources, such as those manufactured by Reuter-Stokes of Edison Park, Twinsburg, Ohio, as their Models RS-P4-0803-237 and RS-P4-1406-218. In addition to helium filled counters, other types of neutron detectors are also available, such as non-hygroscopic lithium loaded cesium activated glass scintillation counters.

In practice, neutron logging involves the lowering of the neutron tool into the well borehole. The tool irradiates the formations surrounding the tool with high energy (fast) neutrons. The neutron detectors in the tool then detect the irradiated neutrons from the neutron source after they have collided several times with atoms of the formation and are redirected back to the tool. Neutron logs are generated from the detected neutrons. Neutron logs are used primarily for determining the porosity of the formations encountered by the tool. The neutron detectors develop signals proportional to the amount of hydrogen that is found in the formations.

The high-energy neutrons for these type tools are continuously emitted from a radioactive source in the tool. The principal behind the neutron detector technique is to detect those emitted neutrons that are reflected back from the formation material at a much lower energy level, i.e., slower neutrons. The neutrons are slowed by collisions with the formations. Where the mass of the formation materials is essentially equal to the mass of the neutron there is a maximum loss of energy with each collision between the neutron and the formation. In the case of a neutron, the hydrogen nucleus produces the most amount of energy loss since it is closest in mass to that of the neutron. In a random fashion the emitted neutrons as they undergo numerous collisions eventually are rebounded and strike the neutron detectors contained in the tools. Thus, the amount of signals generated by detected neutrons reflected from the formation materials is an indication of the amount of hydrogen that is contained in the formations.

As with any logging tool that is lowered into a well borehole, it is highly desirable that, before committing the tool to the well, all systems should be operational. Well logging is both an expensive and time-consuming operation and, in most cases, requires shutting down the drilling operation in order for the well logging operation to occur. Because a neutron detector has substantially no background counts, it emits no signals in the absence of the neutron source and the presence of materials surrounding the tool. This surrounding material is necessary to produce the energy loss and random diffusion of neutrons back to the detectors for detection. As a consequence, the operator, while the tool is at the surface, has no way of verifying from the signals emanating from the neutron detectors whether or not they are operational. Accordingly, there is a need to be able to verify the operability of the detectors shortly before the tool is lowered into the well borehole. It should be readily apparent that verification of the operability of the neutron detectors also involves verification of the electronics associated with the detectors. It is those circuits that apply voltages to the detector's internal components as well as to process the detector output signals generated in response to the detected neutrons and gamma rays.

Traditionally, detectors have been checked at the well site by placing material containing large quantities of hydrogen near the detectors, thus simulating the environment the detectors will encounter in the well borehole. A neutron source is then placed near the material. The hydrogen slows the neutrons from the source down to a sufficiently for detection by the helium-3 detectors. The counts thus produced by the detectors are monitored in the normal fashion. An example of this technique is described in the Smith article identified above. The primary drawback to this prior art procedure is that it is very time consuming. Another significant disadvantage to this approach is the danger presented by the necessity of providing exterior to the tool the source of neutrons, which is a radioactive material.

An alternate attempt to provide a solution for verification of neutron detector operability may be found in U.S. Pat. No. 5,180,917. That patent suggests depositing a small amount of radioactive material comprising an alpha source, such as uranium or americium radioisotope, inside the helium-filled detectors in the form of a thin foil of metal or other material. The alpha particle emitted by the radioisotope ionizes the gas and produces a signal similar to that produced by a neutron that interacts with the helium-3.

This method has two drawbacks. First, it involves placing a very small quantity of a radioisotope inside the detector, which means that this technique will only work with new detectors. Second, the amount of radioisotope inserted must be kept small so that the neutron count rates obtained during the logging procedure are not significantly affected. Keeping the quantity of radio isotope inside the detector small consequently means that it will take a long time for a significant number of events to occur to permit verification of the detector's operations.

In view of the foregoing, it would be highly desirable to provide the user of both old and new neutron logging tools with a reliable and efficient technique to determine whether the neutron detectors are actually and properly working, especially just prior to committing the tool to the well borehole.

SUMMARY OF THE INVENTION

According to the present invention there is disclosed a method and apparatus for providing a safe and accurate verification of neutron detector operations prior to commencement of logging operations in a well borehole. The method comprises the steps of simultaneously exposing each of a plurality of neutron detectors to a known source of gamma rays, determining the rate of detected gamma rays by each detector, and comparing the determined rate of detected gamma rays by each detector to an expected value to determine if the detectors are operational.

In a different aspect, the method comprises establishing first and second voltage thresholds, exposing each said detector to a source of gamma rays, comparing the detector pulses to the first and second threshold levels to obtain even signals that are representative of either detected gamma rays or neutrons where detector pulses greater in amplitude than the second threshold represent detected neutrons, and detector pulses greater in amplitude than said first threshold but less than said second threshold represent detected gamma rays, determining the rate of detected gamma rays for each detector and comparing the determined rate of detected gamma rays for each said detector to an expected value to determine if each neutron detector is operational.

In another aspect of the invention, the determination of the rate of detected gamma rays is determined by counting, per unit of time, the detector pulses which are greater in amplitude than the first threshold to obtain a combined count of detected gamma rays and neutrons, and separately counting, per unit of time, the detector pulses which are greater in amplitude than said second threshold to obtain a count of detected neutrons, and subtracting the count of detected neutrons from the combined count where the difference represents the rate of detected gamma rays. An alternate approach to the step of determining the rate of detected gamma rays comprises the step of counting, per unit of time, the detector pulses whose amplitudes are greater than said first threshold but less than said second. In either method of determining the rate of detected gamma rays, the method further includes the step of storing in a memory the counts of the detected neutrons and gamma ray events.

In another aspect of the invention, the step of exposing each detector to a source of gamma rays comprises the step of manually positioning a single source of gamma rays in close proximity to each said detector, one after the other. In yet another embodiment, the step of exposing each detector to a source of gamma rays comprises the step of centrally positioning a single source of gamma rays with respect to the detectors. In yet another embodiment of the invention, the step of exposing each detector to a source of gamma rays comprises the step of mounting a separate source of gamma rays onto each said detector.

In accordance with the apparatus of the present invention, a neutron well logging tool is provided comprising a plurality of neutron detectors, each capable of detecting both neutrons and gamma rays, at least one gamma ray source positioned proximate the detectors for exposing the detectors to gamma rays, a means connected to each said detector for determining the rate of detected neutrons and gamma rays, and means for comparing the rate of detected gamma rays for each detector to an expected value to determine if the detectors are operational.

In accordance with one embodiment of the invention, each said means for determining the rate of detected neutrons and gamma rays by a detector comprises a pulser circuit connected to the output of the detector for generating a detector pulse having an amplitude upon detection of a neutron or gamma ray, a first comparator circuit for comparing each detector pulse to a first threshold level and outputting a combined event pulse each time said detector pulse exceeds said first threshold, a second comparator circuit for comparing each detector pulse to second threshold level and outputting a neutron event pulse each time said detector pulse exceeds said second threshold, a counting means for counting separately, per unit of time, the event pulses from said first and second comparator circuits, and a processing means for forming the difference between the count derived from said combined event pulses and the count derived from said neutron event pulses with the difference representing the rate of detected gamma rays.

In yet another embodiment of the invention, each said means for determining the rate of detected neutrons and gamma rays by a detector comprises a pulser circuit connected to the output of each detector for generating upon detection of a neutron or a gamma ray a detector pulse having an amplitude, a first comparator circuit for comparing each detector pulse to a first and a second threshold level and outputting a gamma ray event pulse each time that the detector pulse amplitude falls between said first and second thresholds, a second comparator circuit for comparing each detector pulse to said second threshold voltage, and outputting a neutron event pulse each time said detector pulse exceeds said second threshold, and counting means for counting separately, per unit of time, the event pulses from said first and second comparator circuits, the count of gamma ray event pulses representing the rate of detected gamma rays.

In yet another embodiment of the invention, each detector has mounted thereon a separate gamma ray source. In yet another embodiment, each detector is exposed to a gamma ray source by manually positioning a single source of gamma rays proximate each said detector, one after the other. The neutron well logging tool of the invention also includes storage means for storing the counted events from said counting means.

DESCRIPTION OF THE INVENTION

Figure 3:
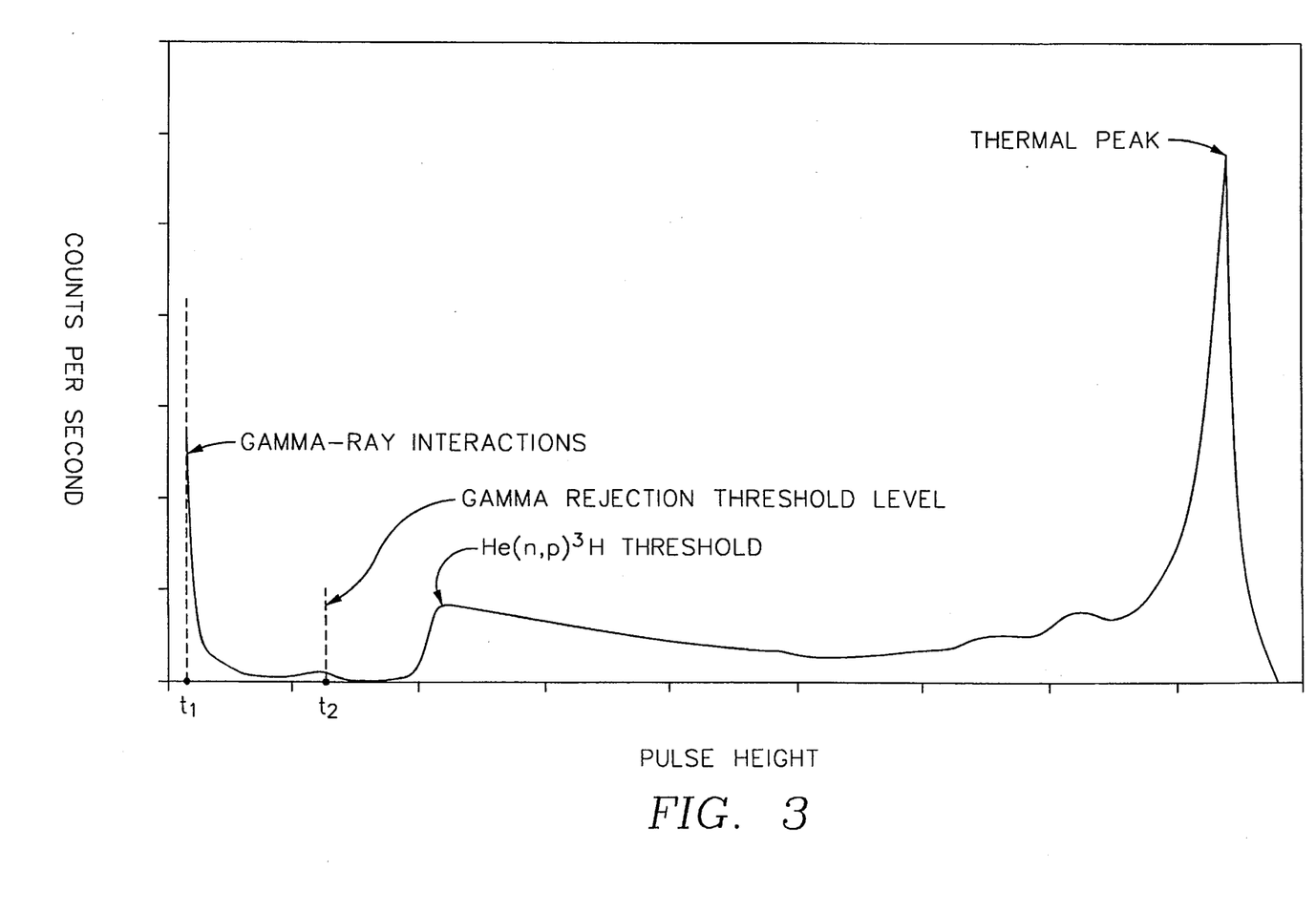
FIG. 3 is a graphical representation of a typical spectrum of ionization pulses for a helium-3 filled proportional counter neutron detector resulting from detected neutrons and gamma rays.

Referring to the Figures, and first to FIG. 3, the graphical representation of a typical spectrum of detected ionization pulses from neutrons and gamma rays in a helium filled proportional counter-type detector is shown. The theory of operation of a helium-3 neutron detector is well described in the literature, for example, in the materials provided by Reuter-Stokes with their helium-3 proportional counters entitled *Fundamentals Of Helium-3 Field Proportional Counters For Neutron Detection*. With respect to these helium-3 neutron detectors, there is an energy level, i.e., pulse amplitude output, at which it is possible to detect the presence of neutron collisions with helium nuclei. This threshold is labeled in FIG. 3 as the "He(n,p)$^3$H THRESHOLD". In typical operations a gamma rejection discrimination level, represented in FIG. 3 by the threshold voltage $t_2$, is provided to reject any detector pulse outputs whose amplitude is less than $t_2$. Only detector pulses whose amplitudes exceed $t_2$ are counted as a detected neutron event.

In accordance with the present invention, a second lower voltage threshold $t_1$ is provided to define a range of detector pulse outputs whose amplitudes are greater than $t_1$ but less than $t_2$. Detector pulses which lie in this amplitude range are generated by the interactions of gamma rays with the helium-3 gas. It is these gamma ray events which are detected and counted by the present invention to provide a qualitative indication of proper operations of the neutron detectors. Threshold $t_1$ should be set low enough to give meaningful information relative to the detection of gamma rays which typically produce pulses at lower output pulse amplitudes, but high enough to reject the noise level that exists in such detectors.

Figure 1:
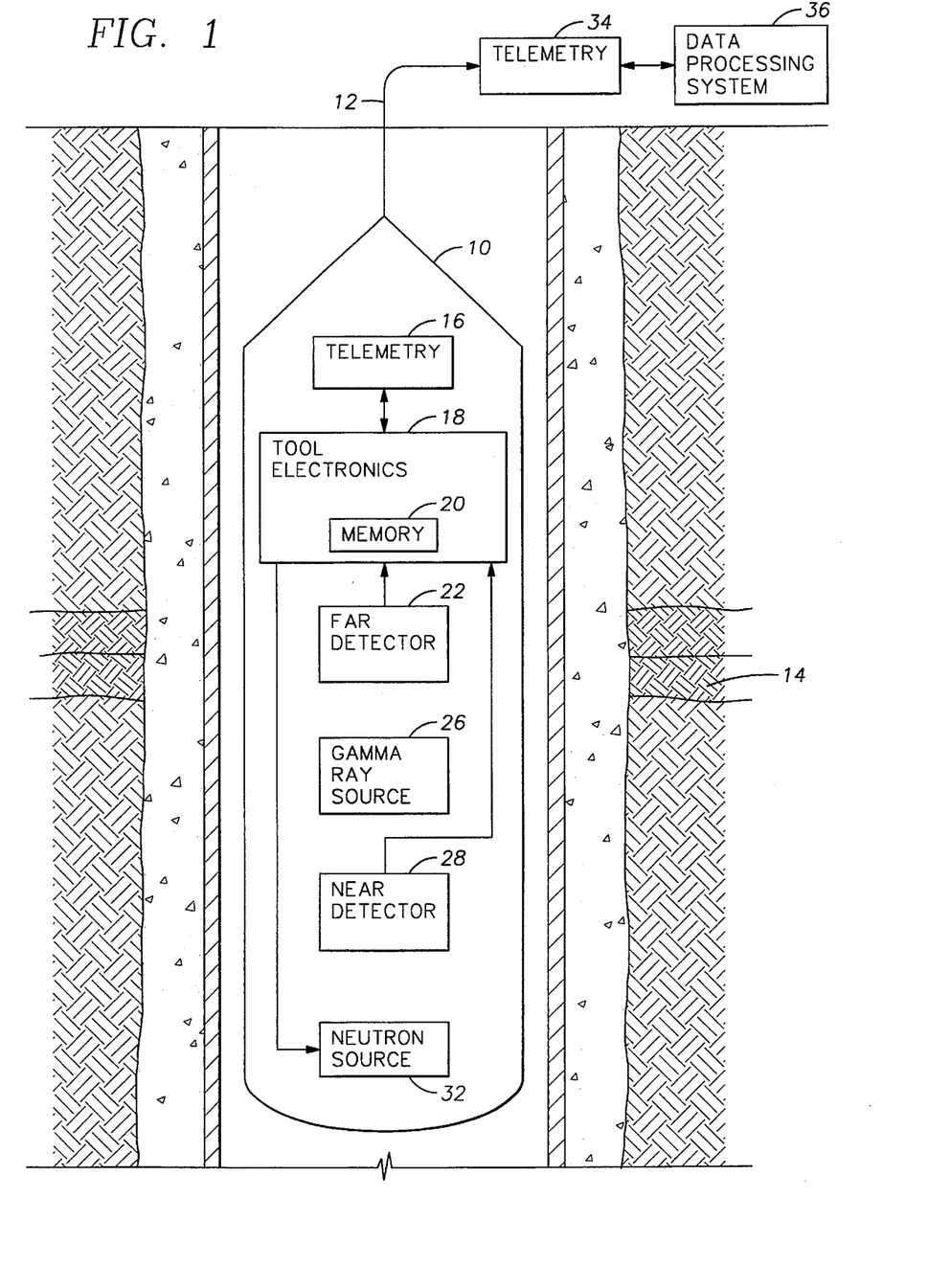
FIG. 1 is a functional block diagram illustration of a neutron logging tool adapted for using the verification method and apparatus in accordance with the present invention.

To describe the operations of one embodiment of the present invention, reference is now made to FIG. 1 which shows a well logging tool 10 that is adapted to be lowered into a well borehole by an armored cable 12 that connects the electronics in the neutron logging tool 10 with the surface data processing system 36. While the present invention is applicable to a neutron logging tool in which continuous communications between the tool electronics and the surface data processing electronics is attained over an armored wireline cable 12, the invention may equally be applicable to a well logging tool of the LWD type (not shown) in which the well logging data, rather than being transmitted from the downhole tool to the surface via an armored cable 12, is stored in a memory 20 contained in the tool electronics for recovery when the logging tool is recovered at the surface. In either type of tool there is always a time just prior to commitment of the tool to the well borehole when it is desirable to verify the operability of the neutron detection systems.

Continuing with respect to FIG. 1, the neutron logging tool 10 includes a source of high energy neutrons 32 for irradiating the sub-surface formations 14 surrounding the tool 10, and a pair of helium-3 filled proportional counter detectors 22, 28. The detector located closest to the neutron source 28 is called the "near detector", while the detector located farthest from the neutron source 22 is called the "far detector". Both the near and far detectors interface to the tool electronics 18 where their signals are further processed. The neutron source 32 may be either of the pulsed or continuous type. For a pulsed type, the neutron source 32 would receive its control via the tool electronics 18.

Output data from the tool electronics 18 is transmitted to the surface through a telemetry circuit 16 that communicates directly with a second telemetry circuit 34 located at the surface. Connected to the output of the telemetry circuit 34 is a data processing system 36 which receives and processes the data collected during the well logging operation. In addition, the data processing system 36 can, via the telemetry circuit 34, transmit command and control information downhole to the telemetry circuit 16 in the neutron tool. There the telemetry circuit 16 communicates with the tool electronics 18 as part of the well logging operations.

Figure 4:
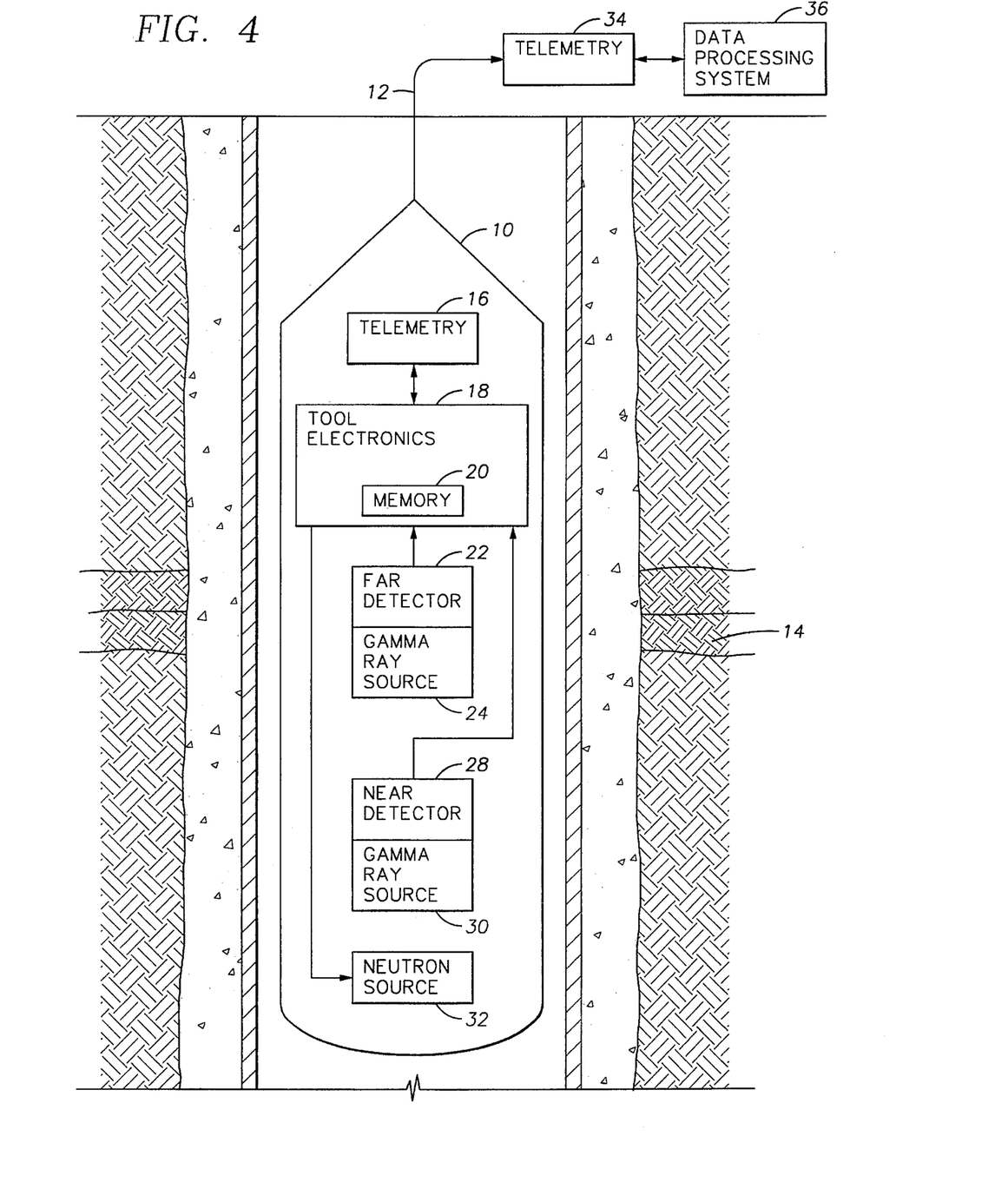
FIG. 4 is a functional block diagram illustration of a neutron logging tool as depicted in FIG. 1, with a single internal source for use in accordance with the present invention.

Still referring to FIG. 1, there is shown a source of gamma rays 26 that is centrally positioned to the near and far detectors 28 and 22. In this position both the near and far detectors are exposed to the gamma rays from the source 26. The present invention contemplates (As depicted in FIG. 4), in lieu of providing a centrally located single source of gamma rays, separate sources of gamma rays 24 and 30 which are mounted directly to the near and far detectors, respectively. As between these two embodiments the preferred arrangement is for separate gamma ray sources 24 and 30, each attached to one of the detectors. In this fashion, the largest number of gamma ray interactions can be detected by the respective detectors and, accordingly, the time to verify the operability of the detectors enhanced over what would be possible from the separate single gamma ray source centrally positioned relative to the detectors.

Figure 6:
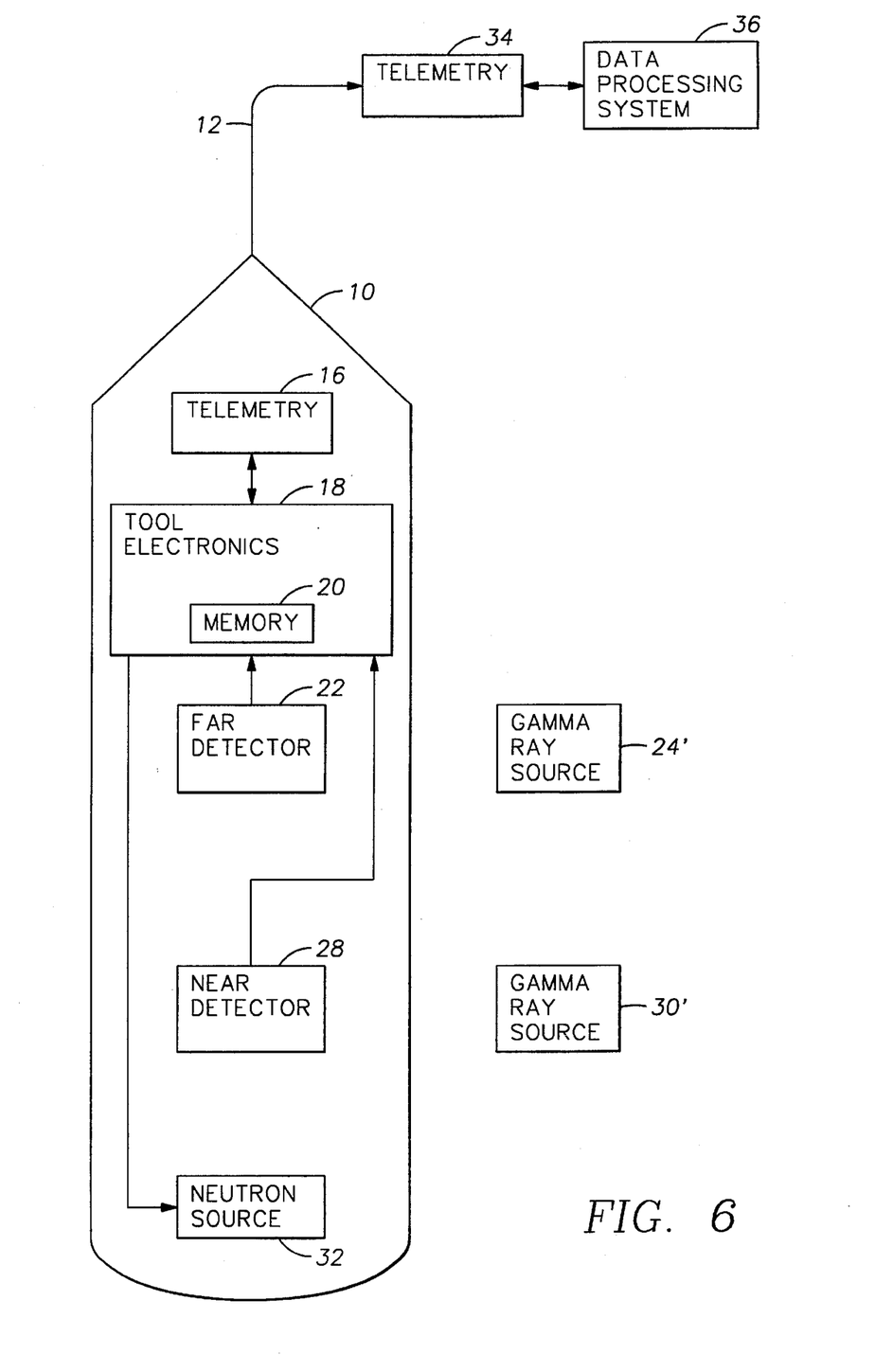
FIG. 6 is a functional block diagram of a neutron logging tool as depicted in FIG. 1, but having a plurality of external gamma ray sources, for use in accordance with the present invention.
Figure 7:
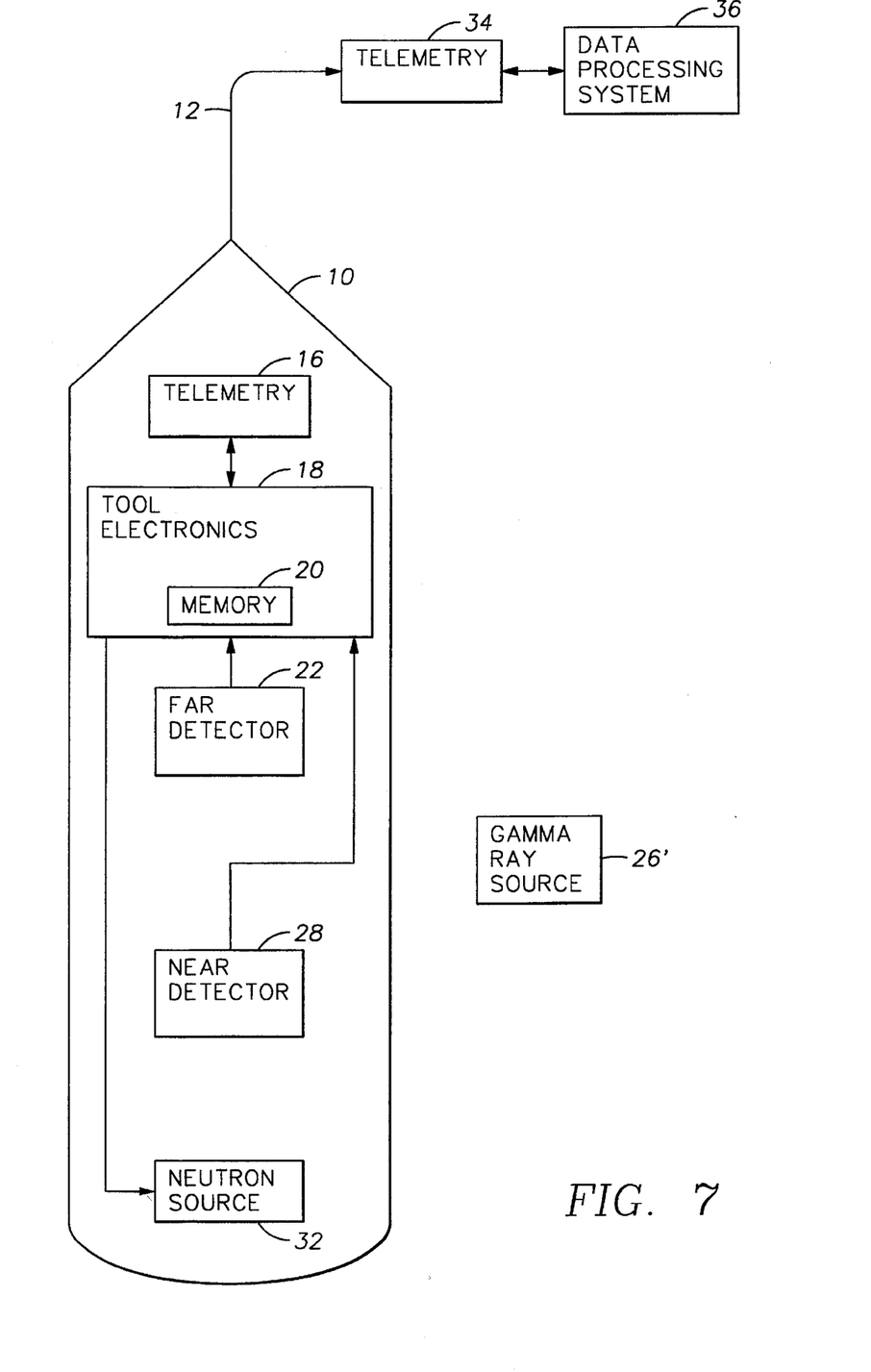
FIG. 7 is a functional block diagram illustrative of a neutron logging tool as depicted in FIG. 1, but with a single external source for use in accordance with the present invention.

In an alternate embodiment, and as depicted in FIGS. 6 and 7, a source or sources, rather than having the gamma ray source inside the tool, a source or sources of gamma rays may be used external to the tool in which the user positions a single source 26' of gamma rays proximate each of the two detectors, one at a time, on the external surfaces of the tool or places a separate source 24', 30' next to each detector. In the embodiment where only a single source is used externally, the counting of detected gamma rays would have to be determined on a detector-by-detector basis. This embodiment produces a slower verification time at the surface because of the need to move the source from detector to detector over what would be possible if a separate source of gamma rays were mounted to or positioned over each of the neutron detectors.

Figure 2:
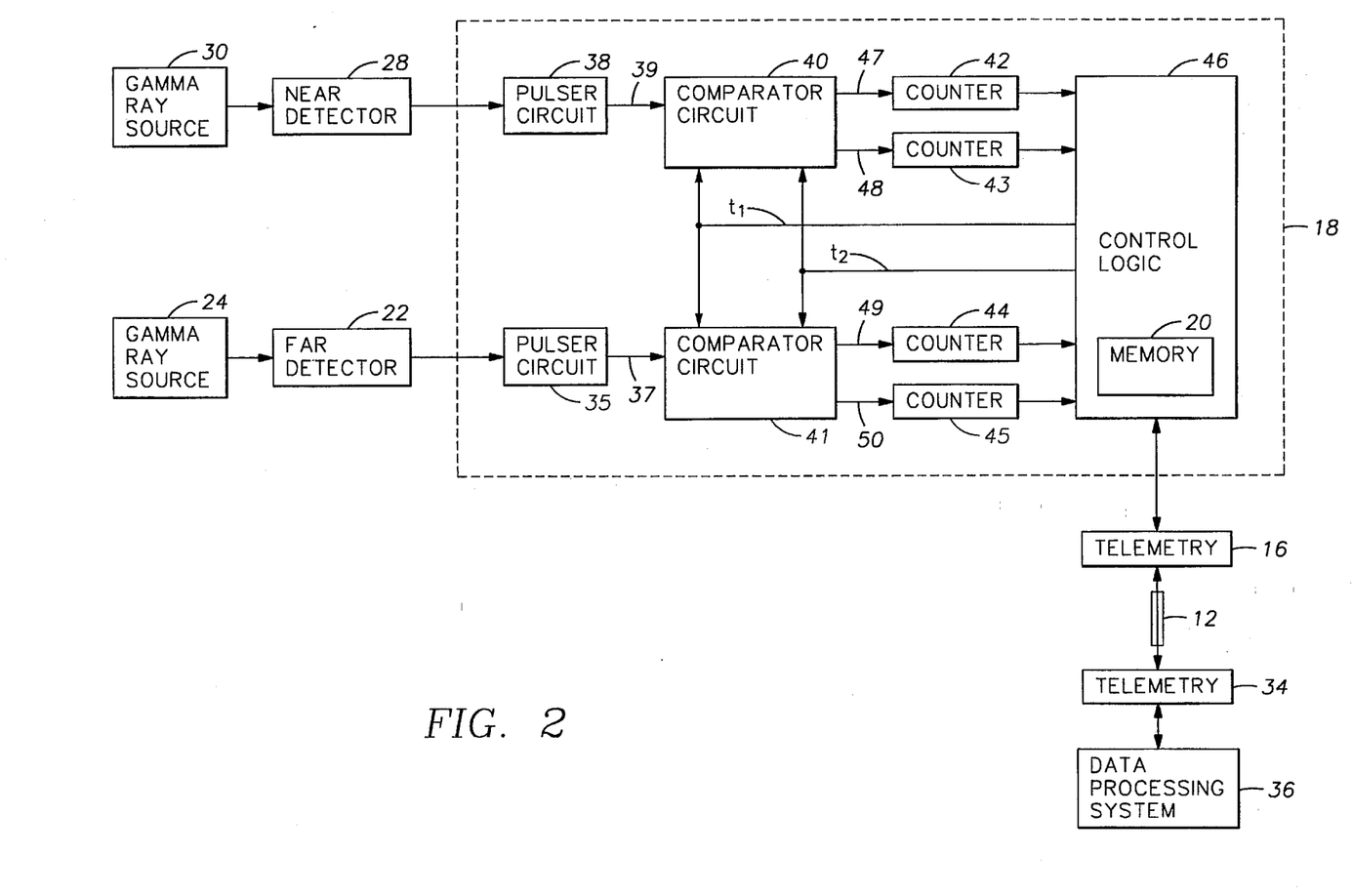
FIG. 2 is a functional block diagram of the electronics of the preferred embodiment logging tool in accordance with the present invention.
Figure 5:
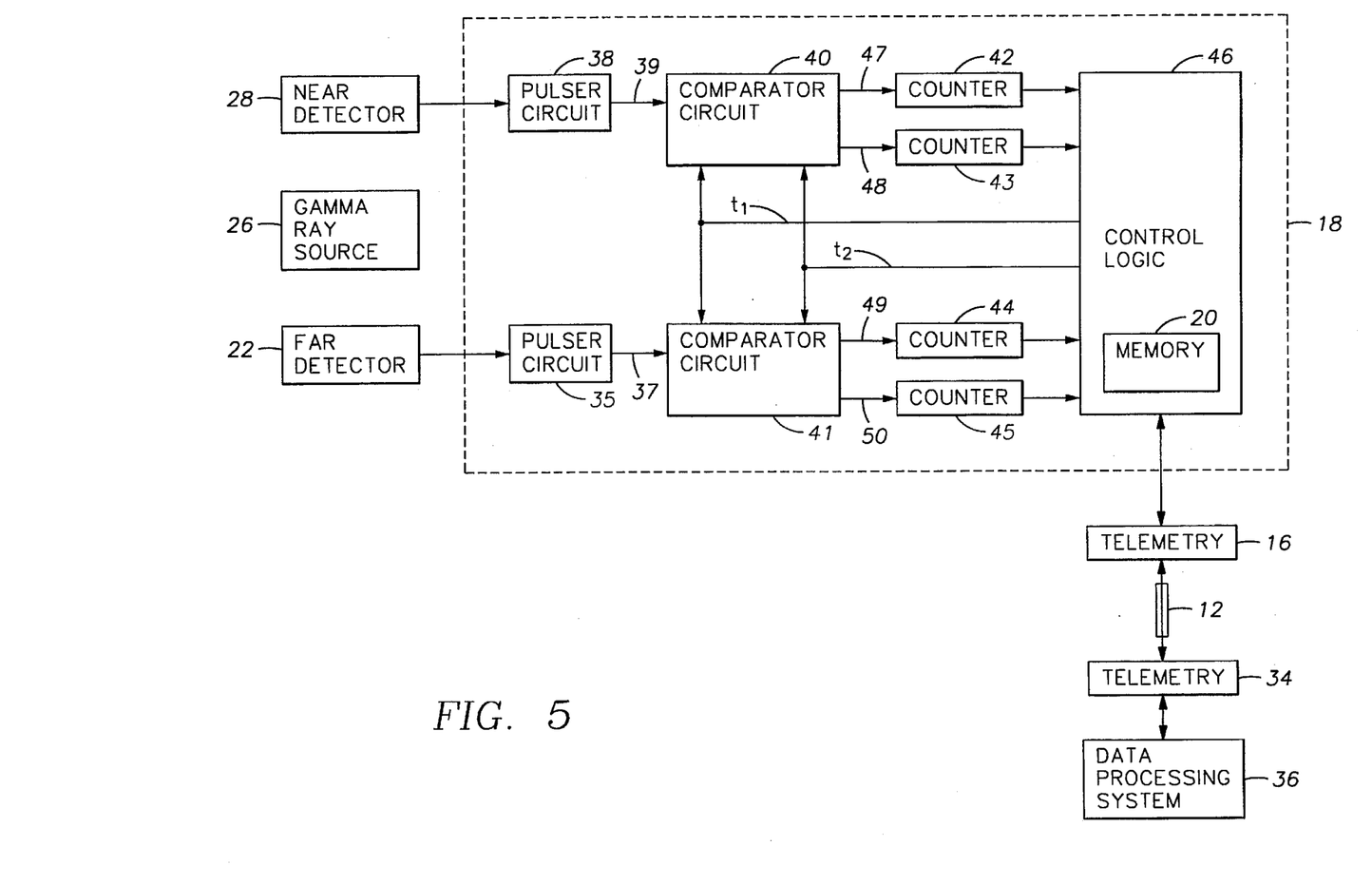
FIG. 5 is a functional block diagram of the electronics of an alternative embodiment logging tool in accordance with the present invention, corresponding to the embodiment depicted in FIG. 4.

Turning now to FIGS. 2 and 5, there is shown a more detailed functional block diagram for the electronics of a tool in accordance with the invention for obtaining the rate of detected gamma rays by both neutron detectors 22 and 28 in response to the presence of the gamma source 26 (FIG. 2) or the sources 24 and 30 (FIG. 5). In the upper left hand corner of FIG. 2, there is shown the gamma ray source 30 which, in the preferred embodiment, would be mounted onto the near detector 28. As each gamma ray interacts with the helium in detector 28, a pulse having an amplitude less than $t_2$ but greater than $t_1$ is developed. If the event detected by the near detector 28 is in response to a neutron collision, such as is encountered in the well borehole during normal logging operations, a pulse greater in amplitude than $t_2$ is developed.

In either event, the output from the near detector 28 is applied to an associated pulser circuit 38, which in turn develops on its output 39 a voltage pulse appropriate for logic circuits. The output of the pulser circuit 38 represents a detector pulse whose amplitude is indicative of whether the detected event was a gamma ray (low energy event) or a neutron (high energy event). The output of the pulser circuit 38 is applied via line 39 to a comparator circuit 40 which also receives two reference voltages "$t_1$" and "$t_2$". These two reference voltages, $t_1$ and $t_2$, are also illustrated in FIG. 3. The thresholds $t_1$ and $t_2$ are used to determine which of two events were detected by a neutron detector, a gamma ray, whose pulse amplitude falls within the range of $t_1$ to $t_2$, or a neutron, whose pulse amplitude is greater than $t_2$.

The comparator circuit for comparing the detector pulses on line 39 to the two threshold voltages $t_1$ and $t_2$ as shown in the block diagram of FIG. 2 may be configured in conventional ways to develop two pulse outputs on signal lines 47 and 48. In the first arrangement, the first output 47 will represent all detector pulses that exceed the first threshold $t_1$, and thus would represent all detected events of both gamma rays and neutrons. This first output of comparator pulses would be counted by counter 42. The second output 48 from comparator circuit 40 would be developed for all of those detector pulses that exceeded the second threshold $t_2$ and would be counted by counter 43. Thus, the count in counter 42 would represent the detection of all events, both gamma rays and neutrons, while the count in counter 43 would represent the detection of just neutrons. In this manner the difference between the count in counter 42 to that in 43 would represent detected gamma rays. If the counters are allowed to accumulate counts over some period of time, for example, every 20 milliseconds, the resulting count difference would represent a rate of detected gamma rays and the count in counter 43 a rate of detected neutrons. From these periodic samples it is possible to obtain the rate of detected gamma rays and neutrons at a rate of counts per second, if that number is desired.

In a second arrangement for comparator circuit 40, the detector pulses 39 are again compared to the two thresholds $t_1$ and $t_2$ to again produce two event pulses on lines 47 and 48. In this second arrangement the event pulses on line 47 would represent the detection of all detector pulses 39 that are greater than the first threshold $t_1$ but less than the second threshold $t_2$. Again, these event pulses are counted by counter 42. In this second arrangement counter 42 would represent the detected gamma ray events which by definition produce pulses which fall within the range of the first and second threshold levels $t_1$ and $t_2$. Similarly, all detector pulses on line 39 that exceed the second threshold $t_2$ would produce an event pulse on line 48 which is counted by counter 43 to develop the number of neutron events detected. Because, in this second arrangement, counter 42 develops the actual count of gamma rays there is no need for subtraction of the counts in counter 43. The output of counter 42 may be used directly as an indication of the rate of detected gamma rays.

Still referring to FIG. 2, in the same way as described above for the near detector 28, the far detector 22 in response to the gamma source 26 or gamma source 24 generates signals which are processed to develop the rate of detected gamma rays. That is, a pulser circuit 35 develops detector pulses on line 37 in the same way as the pulser circuit 38 develops pulses on line 39. Comparator circuit 41 processes those detector pulses on lead 37 in either of the above-described arrangements for comparator 40 to provide via counters 44 and 45 an indication of the rate of detected gamma rays and a count representative of the rate of detected neutrons, respectively.

The outputs of the counters 42, 43, 44, and 45 are applied to control logic 46 that will either store in a memory 20 the resulting counts for later recovery at the surface or to transmit any or all of the counts to the surface via the telemetry circuit 16 and the wireline 12. At the surface the counts are made available to the operator for an indication of the operations of the detectors in response to the presence of the gamma ray sources. Once the operator has the data representing the rate of detected gamma rays, it is possible to compare those rate(s), either automatically in the data processing system 36 or manually through a visual indication, to a determined amount that is expected from a properly operating detector in response to the known source of gamma rays provided. From this comparison, the operator can verify the operability of the detectors prior to commitment of the neutron tool to the well borehole.

In an alternate embodiment neither the gamma ray source 26 nor the gamma ray sources 24 and 30 are provided in the tool itself, but rather are provided externally to the tool. In this embodiment a gamma ray source is positioned next to each of the two detectors 22 and 28, one after the other, or at the same time, and the system run to develop the rate of detected gamma rays in counters 42 and 44, respectively. As each rate of detected gamma rays is determined it can be transmitted to the surface data processing system 36 for processing in the similar fashion previously described for a source or sources embodied within the tool itself.

The operations described above for a neutron tool operating with an armored wireline cable are equally applicable to a neutron tool contained in a LWD arrangement. Such neutron tools make use of the memory means 20 to store detected neutron events while logging for later recovery and processing at the surface. Since such tools come equipped with means for interrogating the stored memory data, such circuits could also be used to extract the surface verification data generated in response to the gamma ray sources.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. A method of determining the operations of a plurality of neutron detectors in a neutron well logging tool, each said neutron detector generating an output pulse in response to the detection of a gamma ray or a neutron, comprising the steps of:

(a) establishing first and second voltage thresholds;

(b) exposing each said detector to a source of gamma rays;

(c) comparing said detector pulses to said first and second threshold levels thereby to obtain event signals representative of detected gamma rays or neutrons for each said detector, in which (i) detector pulses greater in amplitude than said second threshold represent detected neutrons, and (ii) detector pulses greater in amplitude than said first threshold but less than said second threshold represent detected gamma rays;

(d) determining the event signal rate of detected gamma rays for each said detector; and (e) comparing the determined rate of detected gamma rays for each said detector to an expected value to determine if each said neutron detector is operational.

2. The method of claim 1 wherein the step of determining for each said detector the rate of detected gamma rays comprises the steps of:

(a) counting per unit of time the detector pulses which are greater in amplitude than said first threshold to obtain a combined count representative of detected gamma rays and neutrons;

(b) counting per unit of time the detector pulses which are greater in amplitude than said second threshold to obtain a count representative of detected neutrons; and (c) subtracting the count of representative detected neutrons from the combined count, the difference representing the rate of detected gamma rays.

3. The method of claim 1 wherein the step of determining for each said detector the rate of detected gamma rays comprises the step of counting per unit of time the detector pulses whose amplitudes are greater than said first but less than said second threshold.

4. The method of claim 1, 2 or 3 wherein said neutron detectors are helium filled detectors.

5. The method of claim 1, 2 or 3 wherein said neutron detectors are lithium loaded glass scintillation detectors.

6. The method of claim 2 or 3 further including the step of storing in a memory the counts representative of the detected neutrons and gamma ray events.

7. The method of claim 1 wherein the step of exposing each detector to a source of gamma rays comprises the step of manually positioning a single source of gamma rays in close proximity to each said detector, one after the other.

8. The method of claim 1 wherein the step of exposing each detector to a source of gamma rays comprises the step of manually positioning a separate source of gamma rays in close proximity to each said detector at the same time.

9. The method of claim 1 wherein the step of exposing each detector to a source of gamma rays comprises the step of centrally positioning a single source of gamma rays with respect to said detectors.

10. The method of claim 1 wherein the step of exposing each detector to a source of gamma rays comprises the step of mounting a separate source of gamma rays onto each said detector.

11. A neutron well logging tool comprising:
    (a) a plurality of neutron detectors each capable of detecting both neutrons and gamma rays;
    (b) at least one gamma ray source positioned proximate said detectors for exposing said detectors to gamma rays;
    (c) means connected to each said detector for determining the rate of detected neutrons and gamma rays by each said detector; and
    (d) means for comparing the rate of detected gamma rays for each said detector to an expected value to determine if the detectors are operational.

12. The neutron well logging tool of claim 11 wherein each said means for determining the rate of detected neutrons and gamma rays by a detector comprises:
    (a) a pulser circuit connected to the output of said detector for generating a detector pulse having an amplitude upon detection of a neutron or a gamma ray;
    (b) a first comparator circuit for comparing each detector pulse to a first threshold level, said first comparator circuit outputting a combined event pulse each time said detector pulse exceeds said first threshold;
    (c) a second comparator circuit for comparing each detector pulse to a second threshold level, said second comparator circuit outputting a pulse representative of a neutron event each time said detector pulse exceeds said second threshold;
    (d) counting means for counting separately per unit of time the event pulses from said first and second comparator circuits; and
    (e) processing means for forming the difference between the count derived from said combined event pulses and the count derived from said pulses representative of neutron events, the difference representing the rate of detected gamma rays.

13. The neutron logging tool of claim 11 wherein each said means for determining the rate of detected neutrons and gamma rays by a detector comprises:
    (a) a pulser circuit connected to the output of said detector for generating upon detection of a neutron or a gamma ray a detector pulse having an amplitude;
    (b) a first comparator circuit for comparing each detector pulse to a first and a second threshold level, said first comparator circuit outputting a gamma ray event pulse each time said detector pulse amplitude falls between said first and second thresholds;
    (c) a second comparator circuit for comparing each detector pulse to said second threshold voltage, said second comparator circuit outputting a pulse representative of a neutron event each time said detector pulse exceeds said second threshold; and
    (d) counting means for counting separately per unit of time the event pulses from said first and second comparator circuits, the count of gamma ray event pulses representing the rate of detected gamma rays.

14. The logging tool of claim 11, 12 or 13 wherein said neutron detectors are helium filled detectors.

15. The logging tool of claim 11, 12 or 13 wherein said neutron detectors are lithium loaded glass scintillation detectors.

16. The neutron well logging tool of claim 12 or 13 further including storage means for storing the counted events from said counting means.

17. The neutron well logging tool of claim 11 wherein each said detector has mounted thereon a separate gamma ray source.

18. The neutron well logging tool of claim 11 wherein said at least one gamma ray source is positioned proximate each said detector and external to said tool.

19. The neutron well logging tool of claim 11 wherein a plurality of separate gamma ray sources are positioned external to said tool, and wherein each detector is positioned proximate a representative detector.

20. A method for verifying the operability of the neutron detectors in a neutron logging tool prior to insertion into a well, comprising the steps of:
    (a) exposing each of said neutron detectors to a known source of gamma rays, each said detector outputting a pulse in response to a detected gamma ray or a detected neutron;
    (b) determining the rate of detected gamma rays by each said detector; and
    (c) comparing the determined rate of detected gamma rays for each detector to an expected value to determine if said detectors are operational.

21. The method of claim 20 wherein the step of exposing said detectors to a gamma ray source comprises the step of attaching to each said detector its own separate source.

22. The method of claim 20 wherein the step of exposing said detectors to a gamma ray source comprises the step of providing a single source centrally positioned relative to said detectors.

23. The method of claim 20 in which the step of determining the rate of detected gamma rays comprises the steps of:
    (a) establishing first and second thresholds;
    (b) comparing the pulse outputs from each said detector to said thresholds; and
    (c) counting each said output pulse whose amplitude is greater than said first threshold but less than said second threshold thereby to obtain the rate of detected gamma rays by each said detector.

24. The method of claim 20 in which the step of determining the rate of detected gamma rays comprises the steps of:
    (a) establishing first and second thresholds;
    (b) comparing the pulse outputs from each said detector to said thresholds;

(c) counting each said detector output pulse whose amplitude is greater than said first threshold to obtain a combined count;

(d) counting each said detector output pulses whose amplitude is greater than said second threshold to obtain a count representative of neutrons; and (e) subtracting said count representative of neutrons from said combined count for each said detector to obtain the rate of detected gamma rays for said detectors.

25. The method of claim 23 or 24 wherein said neutron detectors are helium filled detectors.

26. The method of claim 23 or 24 wherein said neutron detectors are lithium loaded glass scintillation detectors.

27. The method of claims 23 or 24 further including the step of storing in a memory the counts obtained from counting the detected gamma rays and the count representative of neutrons by each said detector.

* * * * *